United States Patent
Donkervoet et al.

(10) Patent No.: US 11,870,179 B2
(45) Date of Patent: Jan. 9, 2024

(54) PIN ASSEMBLY HAVING A SEAL

(71) Applicant: TE Connectivity Services GmbH, Schaffhausen (CH)

(72) Inventors: Oliver Donkervoet, Winston Salem, NC (US); Rohan Narang, Winston Salem, NC (US); Gregg Eisenmann, Winston Salem, NC (US); Jerry S. Campbell, Winston Salem, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 0 days.

(21) Appl. No.: 17/226,224

(22) Filed: Apr. 9, 2021

(65) Prior Publication Data

US 2022/0329001 A1    Oct. 13, 2022

(51) Int. Cl.
*H01R 13/52*    (2006.01)
*H01R 4/2406*    (2018.01)
*F16J 15/02*    (2006.01)

(52) U.S. Cl.
CPC .......... *H01R 13/521* (2013.01); *F16J 15/021* (2013.01); *H01R 4/2406* (2018.01)

(58) Field of Classification Search
None
See application file for complete search history.

(56) References Cited

U.S. PATENT DOCUMENTS

| | | | |
|---|---|---|---|
| 3,605,076 A | 9/1971 | Dozier | |
| 4,871,062 A * | 10/1989 | Gordon, Jr. | H01R 43/20 206/477 |
| 6,986,677 B2 * | 1/2006 | Janssen | H01R 13/5208 439/275 |
| 7,063,566 B2 * | 6/2006 | Tsuchiya | H01R 13/4223 439/587 |
| 9,368,898 B2 * | 6/2016 | Xu | H01R 13/055 |
| 10,205,285 B2 * | 2/2019 | Sasaki | H01R 13/6581 |

FOREIGN PATENT DOCUMENTS

| | | |
|---|---|---|
| DE | 102008061926 A1 | 6/2010 |
| GB | 769452 A | 3/1957 |
| WO | 2009143123 A2 | 11/2009 |

OTHER PUBLICATIONS

Extended European Search Report dated Sep. 1, 2022 corresponding to Application No. 22166499.8-1201, 10 pp.

* cited by examiner

*Primary Examiner* — Ross N Gushi (57) ABSTRACT

A pin assembly includes a plurality of pins and a plurality of seals. The plurality of seals are separate from one another and are each formed from an elastically deformable material. The seals are each disposed on one of the pins and are each retained on the one of the pins by interaction of the elastically deformable material with the one of the pins.

16 Claims, 8 Drawing Sheets

PIN ASSEMBLY HAVING A SEAL

FIELD OF THE INVENTION

The present invention relates to an electrically conductive pin and, more particularly, to a pin assembly including the pin and a seal on the pin.

BACKGROUND

A connector commonly includes a housing and a plurality of pins disposed in the housing. Many applications of such a connector require sealing the pins with respect to the housing. The pins are most frequently sealed with either a sealant dispensed in liquid form and cured around the pins installed in the housing, or with a mat seal disposed in the housing and through which the pins are inserted.

The seal formed with the dispensed sealant, however, requires specific equipment within the assembly system for dispensing and curing the sealant. The dispensed sealant can also often trap air or unintentionally dispense sealant on the pins or other surfaces of the housing, negatively impacting the quality of the seal. The mat seal requires a unique mold for each housing and pin combination, requires additional elements to retain the mat seal in the housing, and can be damaged by the pin during insertion of the pin. The current arrangements for sealing pins with respect to a housing are unreliable and are inefficient in requiring specialized equipment and/or individualized solutions specific to particular applications.

SUMMARY

A pin assembly includes a plurality of pins and a plurality of seals. The plurality of seals are separate from one another and are each formed from an elastically deformable material. The seals are each disposed on one of the pins and are each retained on the one of the pins by interaction of the elastically deformable material with the one of the pins.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 1:
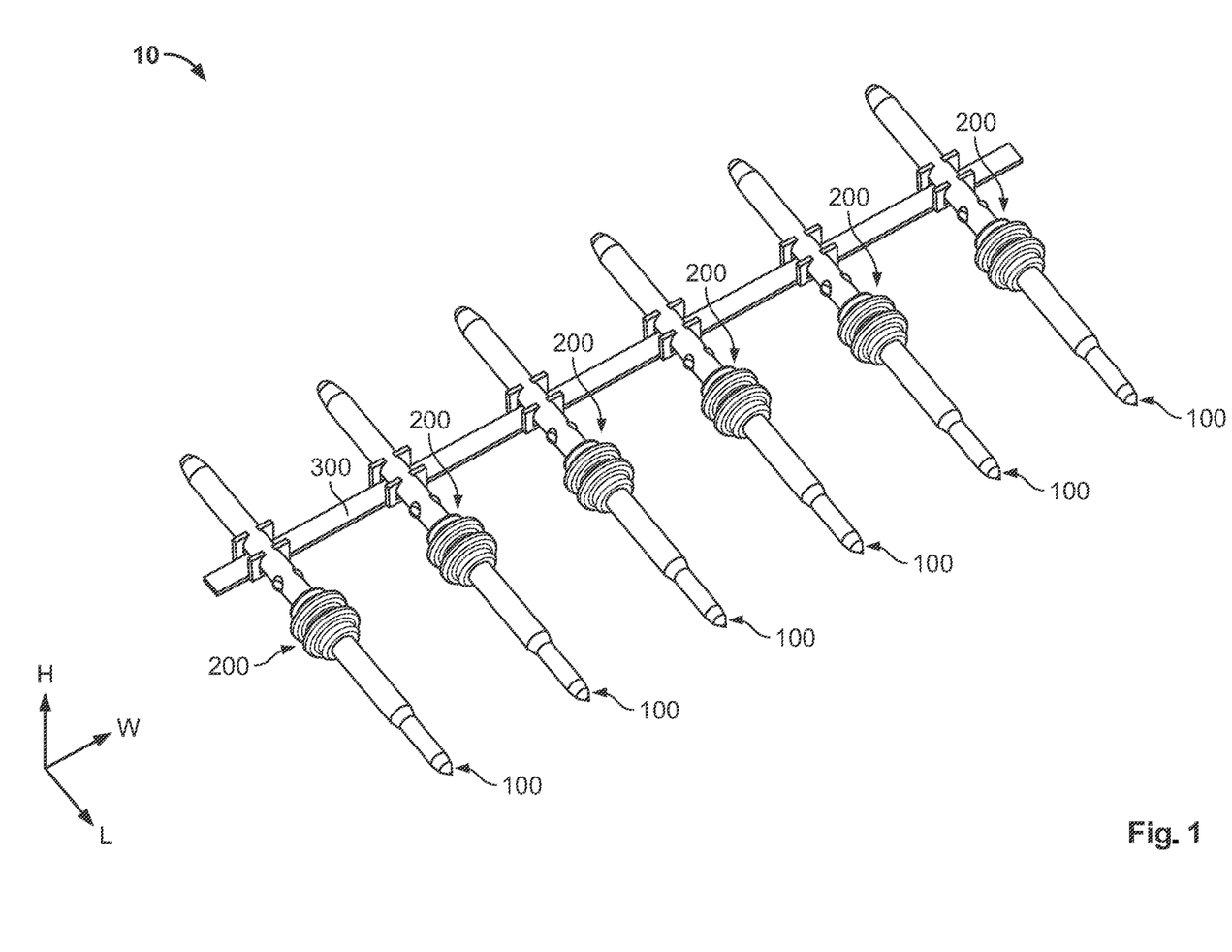
FIG. 1 is a perspective view of a pin assembly according to an embodiment.

A pin assembly 10 according to an embodiment, as shown in FIG. 1, comprises a plurality of pins 100 and a plurality of seals 200 disposed on the plurality of pins 100. In the embodiment shown in FIG. 1, the pin assembly 10 comprises a band 300 to which the plurality of pins 100 are attached.

Figure 2:
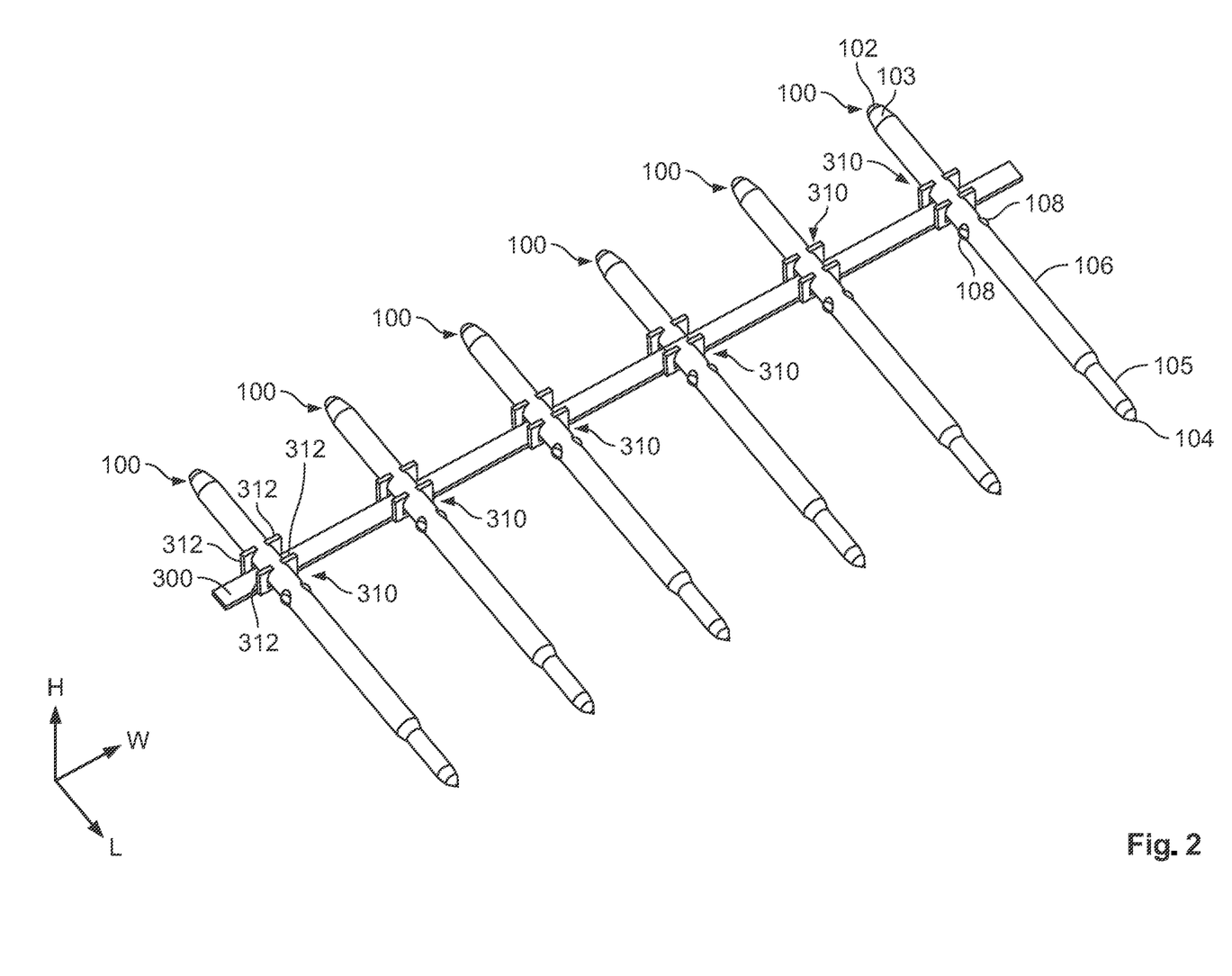
FIG. 2 is a perspective view of a plurality of pins and a band of the pin assembly.

Each of the pins 100, as shown in FIG. 2, is formed in an elongated shape extending from a first end 102 to a second end 104 along a longitudinal direction L. Only one of the pins 100 is labeled in detail in FIG. 2 for clarity of the drawings, but the reference numbers and corresponding description provided herein apply equally to each of the pins 100. In the shown embodiment, the pins 100 are each identical to one another.

The pins 100, as shown in FIG. 2, have an outer surface 106 extending fully around the pin 100 and between the first end 102 and the second end 104 along the longitudinal direction L. The pins 100 are formed from a conductive material, such as copper or aluminum. In the shown embodiment, the pins 100 each have a circular cross-sectional shape forming the outer surface 106 between the first end 102 and the second end 104. In other embodiments, the pins 100 can each have a square or rectangular cross-sectional shape. The cross-sectional shape of the pins 100 can be entirely solid with the conductive material, can be hollow with the conductive material forming only the outer surface 106, or can be any other type of arrangement that forms the outer surface 106 of conductive material between the first end 102 and the second end 104.

Figure 4:
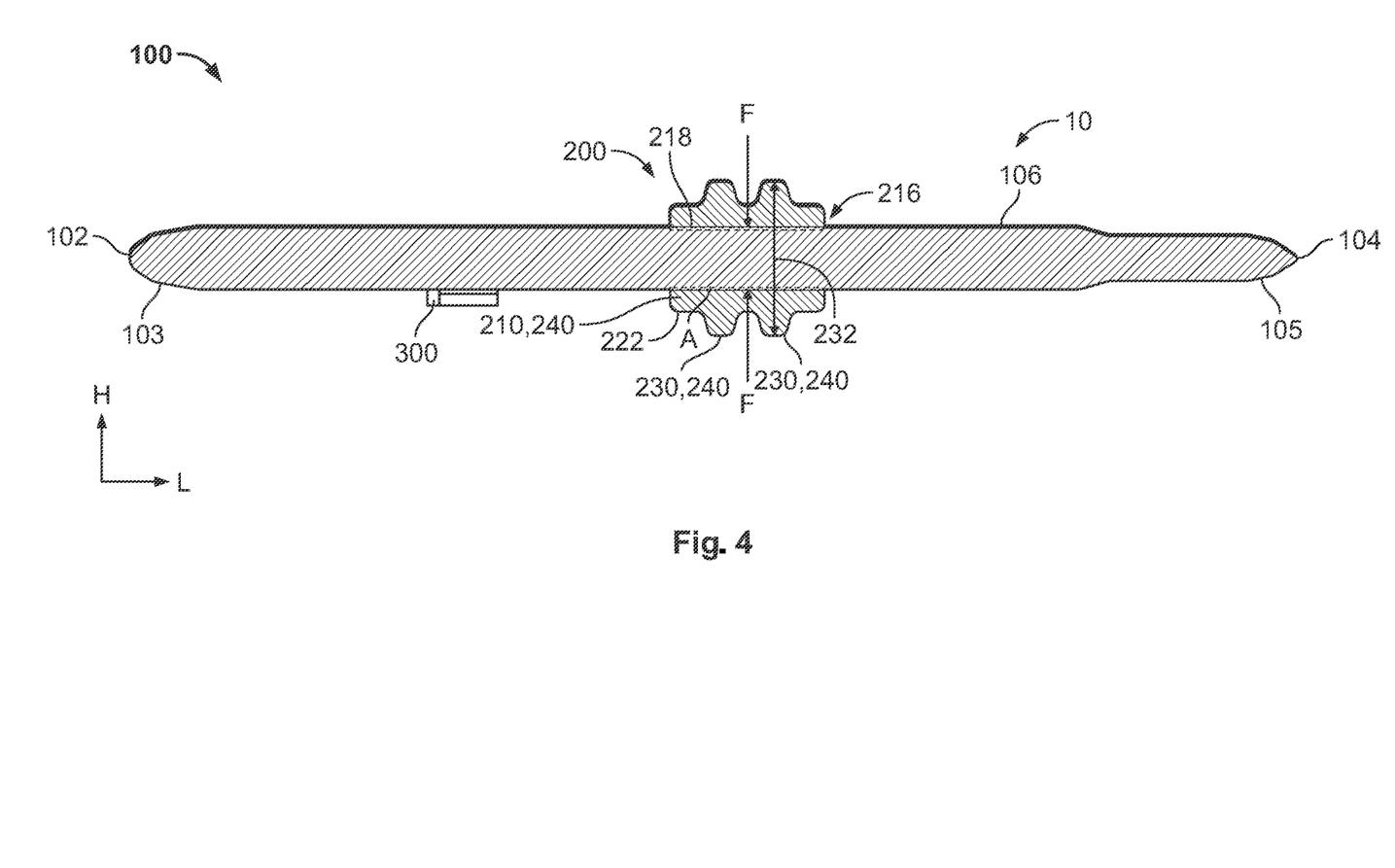
FIG. 4 is a sectional side view of the pin assembly.
Figure 5:
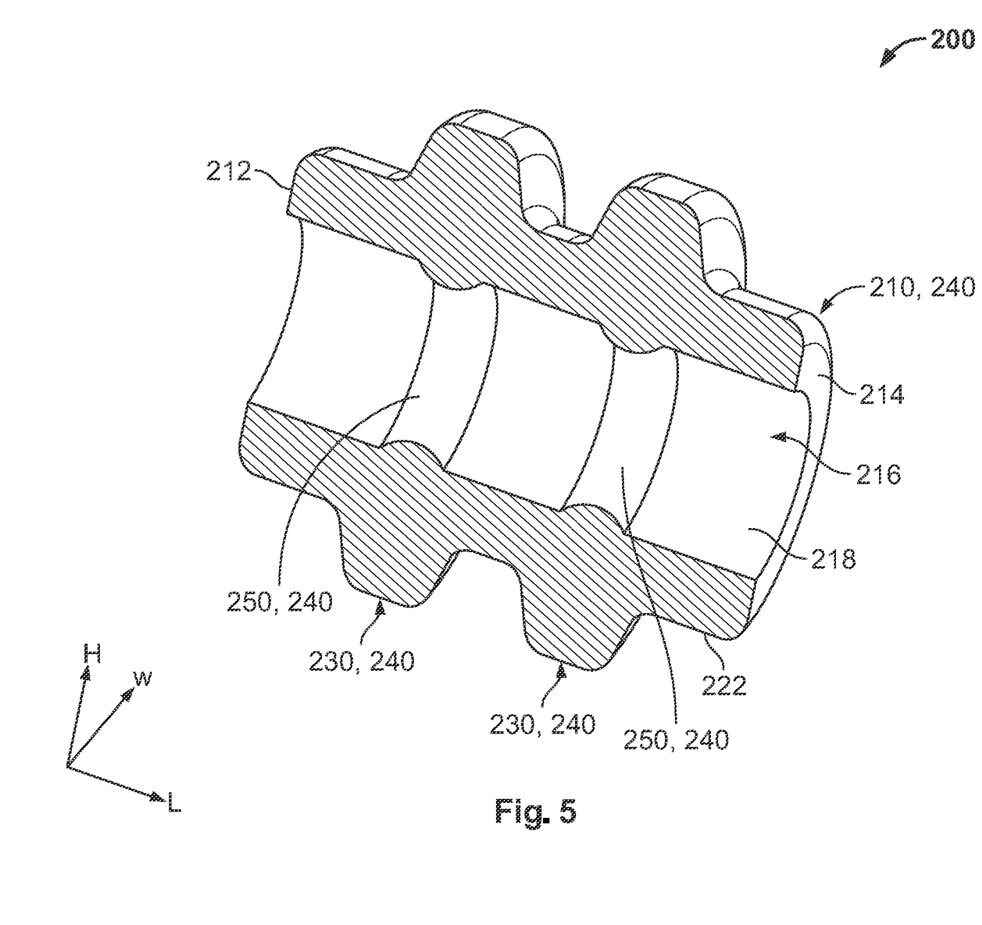
FIG. 5 is a sectional perspective view of a seal according to another embodiment.

As shown in FIGS. 2, 4, and 5, the pins 100 have a first tapered shape 103 at the first end 102 and a second tapered shape 105 at the second end 104. In the embodiment shown in FIGS. 2 and 4, the first tapered shape 103 is different from the second tapered shape 105. In another embodiment, shown in FIG. 5, the first tapered shape 103 may be identical to the second tapered shape 105.

The pins 100, as shown in FIG. 2, each have a pair of barbs 108 extending from the outer surface 106 perpendicular to the longitudinal direction L. The barbs 108 are positioned approximately centrally along the pin 100 between the first end 102 and the second end 104. The barbs 108 are formed from the same conductive material as the pin 100 and, in an embodiment, are integrally formed in a single piece with the pin 100. In the shown embodiment, the barbs 108 each have a curved profile along the longitudinal direction L. In other embodiments, the barbs 108 can each have an angular profile, multiple barbs 108 can be disposed aligned with one another along the longitudinal direction L, or the barbs 108 can be any other type of barb or protrusion used to secure a pin or a contact in a passageway.

Figure 3:
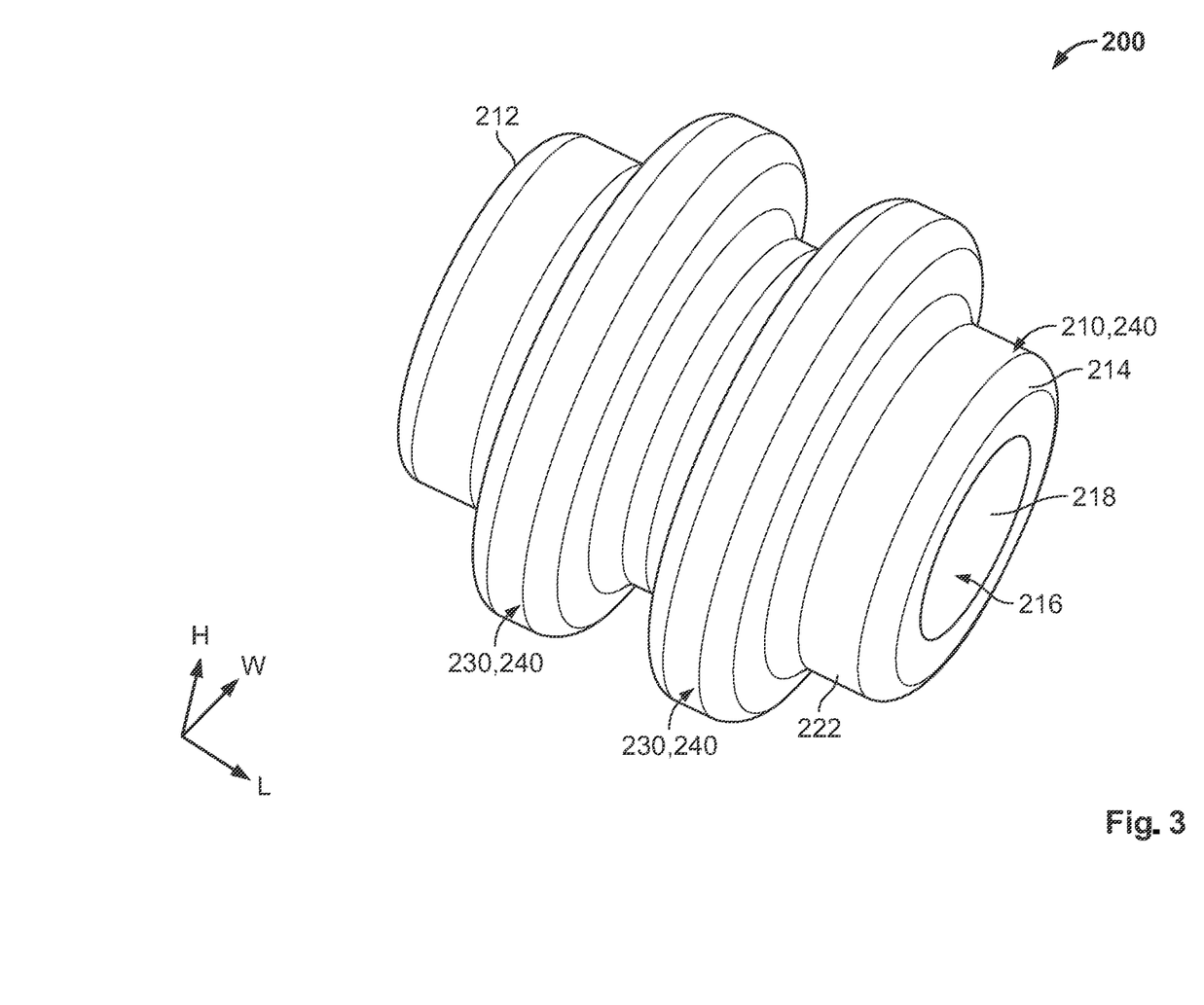
FIG. 3 is a perspective view of a seal of the pin assembly.

Each of the seals 200, as shown in FIG. 3, has a seal body 210 and a plurality of ribs 230 extending from the seal body 210.

The seal body 210, as shown in FIG. 3, has a first end 212 and a second end 214 opposite the first end 212 along the longitudinal direction L. The seal body 210 has a seal passageway 216 extending through the seal body 210 from the first end 212 to the second end 214 along the longitudinal direction L. The seal body 210 has an inner surface 218 facing the seal passageway 216 and an outer surface 222 opposite the inner surface 218. The inner surface 218 has a cross-sectional shape that corresponds to a cross-sectional shape of the pin 100; in the shown embodiment, the inner surface 218 has a circular cross-sectional shape.

The ribs 230, as shown in FIGS. 3 and 4, each protrude from the outer surface 222 of the seal body 210 perpendicular to the longitudinal direction L. The ribs 230, as shown in FIG. 4, each have a rib diameter 232 at a maximum extension of the ribs 230 perpendicular to the longitudinal direction L. In the shown embodiment, two ribs 230 protrude from the outer surface 222 of the seal body 210. In other embodiments, one rib 230 or three or more ribs 230 may protrude from the outer surface 222.

The seal body 210 and the ribs 230 are each formed of an elastically deformable material 240, as shown in FIG. 3. The elastically deformable material may be an elastomer, such as a silicone or a fluorosilicone, but may alternatively be any other type of elastically deformable material 240 that is suitable for the application. In the shown embodiment, the seal body 210 is integrally formed of the elastically deformable material 240 with the ribs 230. In other embodiments, the seal body 210 and the ribs 230 may be formed separately from the elastically deformable material 240 and assembled together.

The band 300, as shown in FIG. 2, has an elongated shape extending along a width direction W perpendicular to the longitudinal direction L. The band 300 has a plurality of securing elements 310 distributed along the width direction W. In the shown embodiment, each of the securing elements 310 has a plurality of hooks 312 extending from the band 300 in a height direction H perpendicular to the longitudinal direction L and the width direction W. Only the hooks 312 of one of the securing elements 310 are labeled in FIG. 2 for clarity of the drawings, but the reference numbers and corresponding description provided herein apply equally to each of the securing elements 310 in the shown embodiment. The hooks 312 each have an L-shape in the shown embodiment and, to form each securing element 310, are positioned in two pairs opposite one another. In other embodiments, the securing elements 310 could be formed in any type of structure that permits releasable securing of other elements, such as the pins 100, to the band 300.

The assembly of the pin assembly 10 will now be described in greater detail with respect to FIGS. 1, 2, and 4.

As shown in the embodiment of FIG. 2, the pins 100 are attached to the band 300 by the plurality of securing elements 310. Each of the pins 100 is attached to the band 300 by one of the securing elements 310; a portion of the pin 100 between the first end 102 and the barbs 108 is held by the securing element 310. In the shown embodiment, the pin 100 is positioned between the hooks 312 of the securing element 310 and the hooks 312 are crimped over the outer surface 106 of the pin 100 to secure the pin 100 to the band 300. In other embodiments, the pins 100 may be attached to other types of securing elements 310 other than by crimping, such as by latching. In the embodiment shown in FIGS. 1 and 2, six pins 100 are attached to six securing elements 310 of the band 300. In other embodiments, any other number of pins 100 may be attached to any other number of securing elements 310 of the band 300.

In an embodiment, with the pins 100 attached to and held by the band 300 as shown in FIG. 2, the seals 200 are positioned on the pins 100 as shown in FIGS. 1 and 4. The seals 200 may be positioned on the pins 100 according to the embodiments described below in a reel-to-reel operation; as the band 300 to which the pins 100 are attached is passed from one reel to another reel. In another embodiment, the band 300 with the securing elements 310 is omitted and the seals 200 are positioned on the pins 100 according to the embodiments described below with the pins 100 provided loosely.

As shown in FIG. 1, the seals 200 are each disposed on one of the pins 100 and are separate from one another. In the shown embodiment, the seals 200 are each identical to one another. The seals 200 are disposed around the outer surface 106 of each of the pins 100 with the inner surface 218 of the seal body 210 directly abutting the outer surface 106 of the pin 100, as shown in FIG. 4. The seals 200 are positioned on each of the pins 100 adjacent to the barbs 108 along the longitudinal direction L. In the embodiment shown in FIG. 1, the seals 200 are each disposed on one of the pins 100 between the barbs 108 and the second end 104 along the longitudinal direction L. In other embodiments, the seals 200 may be positioned elsewhere on the pins 100 along the longitudinal direction L depending on the sealing requirements of the particular application.

The seals 200 are each retained on one of the pins 100 by interaction of the elastically deformable material 240 with the pin 100. In an embodiment, the seals 200 are capable of being retained on the pins 100 only by the interaction of the elastically deformable material 240 with the pins 100; no other components or materials are necessary to retain the seals 200 on the pins 100.

In an embodiment, the seals 200 shown in FIG. 3 are formed separately from the pins 100, and separately from one another, and are installed onto the pins 100 after formation. In this embodiment, the seals 200 are individually molded to a solid state away from the pins 100 and the second ends 104 of the pins 100 are inserted into the seal passageways 216 of the seal bodies 210, sliding the seals 200 onto the pins 100 along the longitudinal direction L to the position shown in FIGS. 1 and 4. In this embodiment, the elastically deformable material 240 is at least slightly elastically stretched by interaction with the outer surface 106 of the pins 100 and provides an elastic force F shown in FIG. 4 perpendicular to the longitudinal direction L and directed toward the pin 100. The seals 200 are retained on the pins 100 by the elastic force F in this embodiment.

In another embodiment in which the seals 200 are formed separately from the pins 100 and separately from one another and are installed onto the pins 100 after formation, each of the seals 200 may additionally have a plurality of protrusions 250 extending from the inner surface 218 into the seal passageway 216, as shown in FIG. 5. The protrusions 250 each protrude from the inner surface 218 perpendicular to the longitudinal direction L and extend circumferentially along the inner surface 218 around the seal passageway 216. The protrusions 250 are each formed of the elastically deformable material 240. In the shown embodiment, the seal body 210 is integrally formed of the elastically deformable material 240 with the ribs 230 and the protrusions 250. In other embodiments, the seal body 210 and the protrusions 250 may be formed separately from the elastically deformable material 240 and assembled together.

The protrusions 250 have a curved profile in the embodiment shown in FIG. 5. In other embodiments, the protrusions 250 could have a profile of any shape that allows the elastic compression of the protrusions 250 described below. In the shown embodiment, two protrusions 250 protrude from the inner surface 218 of the seal body 210. In other embodiments, one protrusion 250 or three or more protrusions 250 may protrude from the inner surface 218.

When the seal 200 according to the embodiment shown in FIG. 5 is slid onto the pin 100 along the longitudinal direction L to the position shown in FIGS. 1 and 4, the protrusions 250 are elastically compressed between the outer surface 106 of the pin 100 and the seal body 210. The elastic compression of the protrusions 250 increases the elastic force F shown in FIG. 4 directed toward the pin 100 that retains the seal 200 on the pin 100.

In another embodiment, the seals 200 are overmolded onto the pins 100 shown in FIG. 2. In this embodiment, the elastically deformable material 240 is applied in a liquid state onto the outer surfaces 106 of the pins 100 between the barbs 108 and the second end 104 along the longitudinal direction L. The elastically deformable material 240 in the liquid state is held in position by a mold as it cures. In the overmolding embodiment, the elastically deformable material 240 adheres to the outer surface 106 of the pin 100 as it cures from the liquid state to a solid state at an adhesion A shown in FIG. 4. The seals 200 are retained on the pins 100 by the adhesion A in the overmolding embodiment. The elastic force F may also help retain the seals 200 on the pins 100 in this embodiment.

Figure 6:
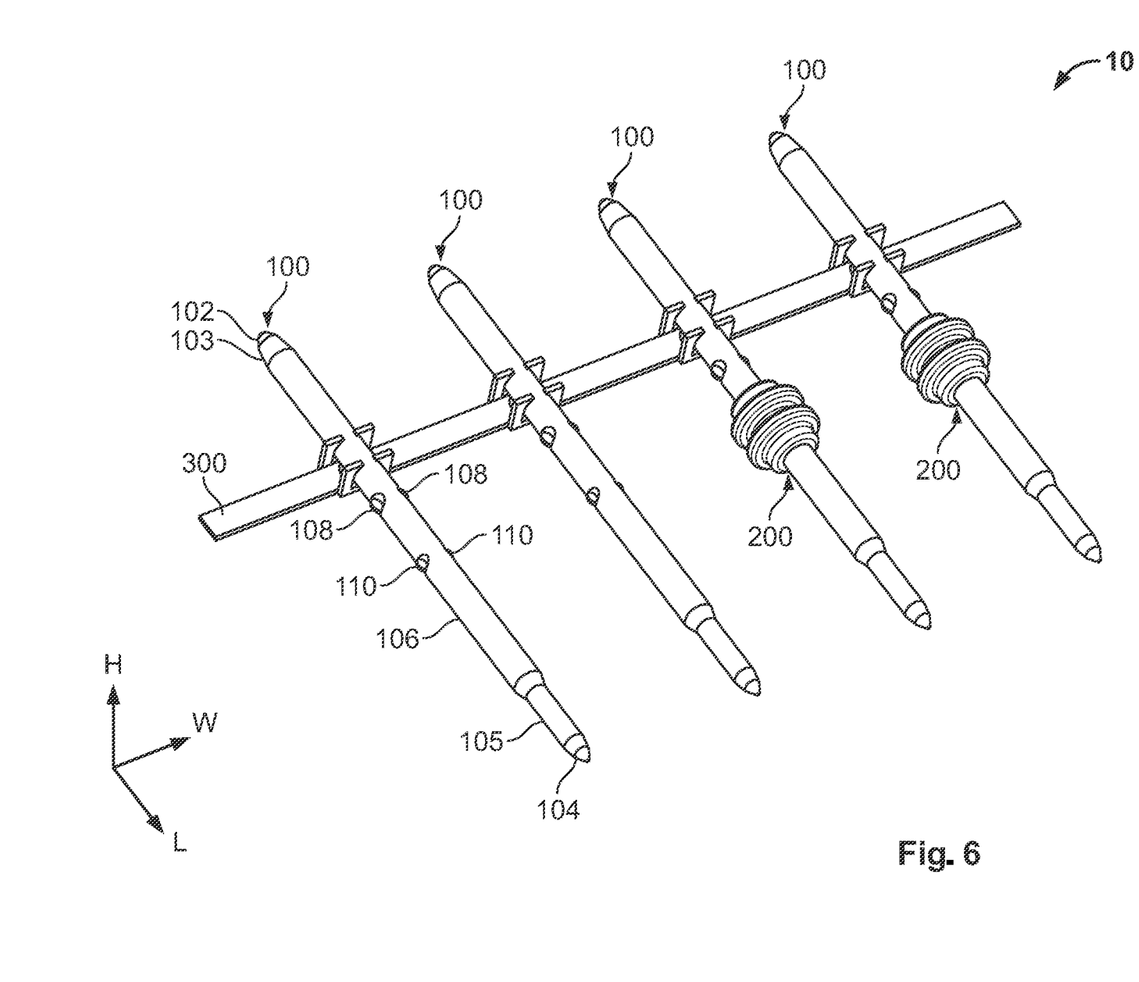
FIG. 6 is a perspective view of a pin assembly including a pin according to another embodiment.

In another embodiment in which the seals 200 are overmolded onto the pins 100, each of the pins 100 may additionally have a pair of projections 110 extending from the outer surface 106 perpendicular to the longitudinal direction L, as shown in FIG. 6. The projections 110 are positioned opposite one another in the width direction W and between the barbs 108 and the second end 104 along the longitudinal direction L. The projections 110 are formed from the same conductive material as the pin 100 and, in an embodiment, are integrally formed in a single piece with the pin 100. In the shown embodiment, the projections 110 each have a curved profile along the longitudinal direction L. In other embodiments, the projections 110 can each have an angular profile, or the projections 110 can be any other type of barb or protrusion that can be used to secure the overmolded seals 200 as described below.

As shown in the embodiment of FIG. 6, the seals 200 are overmolded onto the outer surfaces 106 of the pins 100 around the projections 110. The elastically deformable material 240 in the liquid state is held in position by a mold and cures around the projections 110. The overmolded seals 200 in the embodiment shown in FIG. 6 are retained in the solid state by the adhesion A shown in FIG. 4 and also by mechanical engagement with the projections 110, which further prevents movement of the seals 200 with respect to the pins 100 along the longitudinal direction L.

The pin assembly 10 is shown in a fully assembled state in FIG. 1 and, in another embodiment, in the rightmost two pins 100 of FIG. 6. As described above, in another embodiment, the band 300 can be omitted and the pin assembly 10 in the fully assembled state includes only the pins 100 and the seals 200 shown in FIG. 1 or, in another embodiment, the rightmost two pins 100 and seals 200 shown in FIG. 6.

Figure 7:
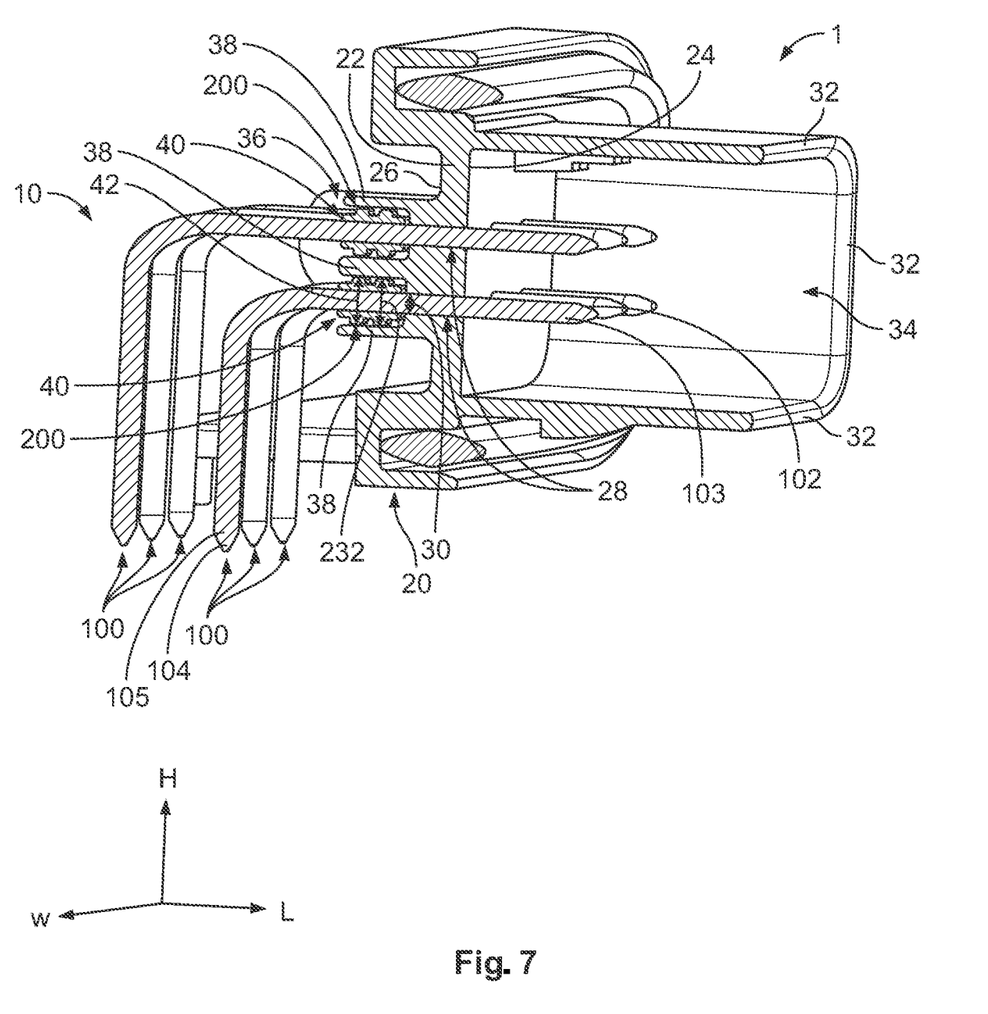
FIG. 7 is a sectional perspective view of a connector according to an embodiment.

A connector 1 according to an embodiment, as shown in FIG. 7, includes a housing 20 and the pin assembly 10 according to any of the embodiments described above disposed in the housing 20.

The housing 20, as shown in FIG. 7, has a rear wall 22, a plurality of side walls 32 extending from the rear wall 22 and defining a mating cavity 34 with the rear wall 22, and a sealing portion 36 extending from the rear wall 22 in a direction opposite the side walls 32.

The rear wall 22, as shown in FIG. 7, extends along a plane defined by the width direction W and the height direction H; the longitudinal direction L is normal to the rear wall 22. The rear wall 22 has a first side 24 and a second side 26 opposite the first side 24 along the longitudinal direction L. The rear wall 22 has a plurality of pin passageways 28 extending through the rear wall 22 along the longitudinal direction L. As shown in FIG. 7, each of the pin passageways 28 has a passageway diameter 30.

As shown in FIG. 7, the side walls 32 extend from the first side 24 of the rear wall 22 along the longitudinal direction L. The side walls 32 form an enclosure around the longitudinal direction L that, with the rear wall 22, defines the mating cavity 34. The pin passageways 28 each communicate with the mating cavity 34.

The sealing portion 36 extends from the second side 26 of the rear wall 22 along the longitudinal direction L and opposite the mating cavity 34, as shown in FIG. 7. The sealing portion 36 has a plurality of sealing walls 38 extending along the longitudinal direction L. A plurality of sealing openings 40 are defined between the sealing walls 38. Each of the sealing openings 40 is aligned with one of the pin passageways 28 along the longitudinal direction L. The sealing openings 40 communicate with the pin passageways 28 and each have an opening diameter 42 that is greater than the passageway diameter 30 of the pin passageways 28.

The housing 20 is formed of an insulative material. In an embodiment, the rear wall 22, the side walls 32 and the sealing portion 36 are integrally formed in a single piece from the insulative material. In another embodiment, the rear wall 22, the side walls 32, and the sealing portion 36 are formed in separate pieces and assembled together to form the housing 20.

A method or process 400 for assembling the connector 1 will now be described in greater detail primarily with reference to FIGS. 7 and 8.

Figure 8:
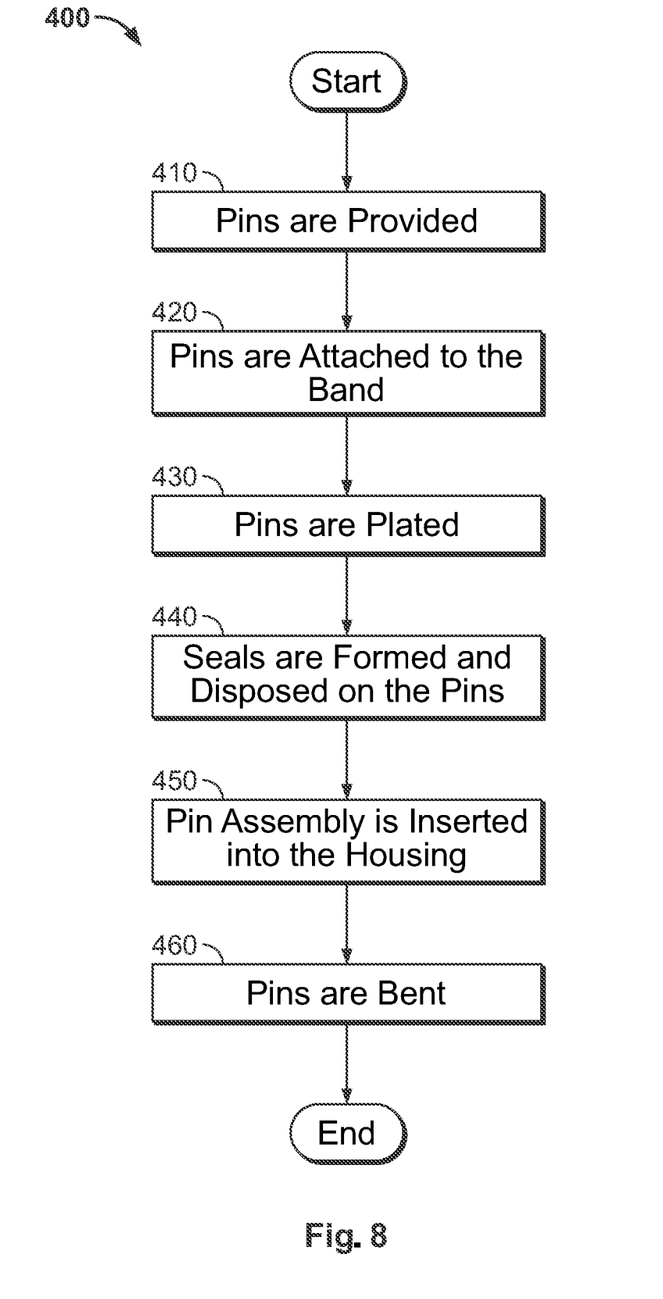
FIG. 8 is a flowchart of a process of assembling the connector.

In a first step 410 shown in FIG. 8, the pins 100 are provided as described above with the ends 102, 104, the outer surface 106, and the barbs 108. In another embodiment, the pins 100 are optionally also provided with the projections 110.

In an optional second step 420 following the first step 410, the pins 100 are attached to the band 300. In the step 420, the pins 100 are each attached to one of the securing elements 310 as shown in FIG. 2 and described in detail above.

In an optional third step 430, the pins 100 are plated. In an embodiment, the pins 100 are plated after being attached to the band 300 in the step 420; in this embodiment, the plating can be applied in a reel-to-reel operation as the band 300 to which the pins 100 are attached is passed from one reel to another reel. In another embodiment, the pins 100 can be plated in the step 430 without being attached to the band 300 in the step 420.

In a step 440 shown in FIG. 8, the seals 200 are formed and disposed on the pins 100, as described in detail above with respect to FIGS. 1 and 4-6, either by overmolding the seals 200 on the pins 100 according to one of the multiple embodiments described above or by forming the seals 200 separately and installing the seals 200 on the pins 100 after formation according to one of the multiple embodiments described above. The step 440, in various embodiments, can follow both of steps 420 and 430, can follow only one of either of the steps 420 and 430, or can directly follow the first step 410 in an embodiment that omits the steps 420 and 430. The step 440 results in the formation of the pin assembly 10.

In a step 450 shown in FIG. 8, occurring after the formation of the pin assembly 10 including the positioning and retention of the seals 200 on the pins 100, the pin assembly 100 is inserted into the housing 20 shown in FIG. 7 and described above. As shown in FIG. 7, the first ends 102 of the pins 100 are inserted through the sealing portion 36 and the pin passageways 28 along the longitudinal direction L. Each of the pins 100 extends through one of the sealing openings 40 and one of the pin passageways 28 into the mating cavity 34. The barbs 108 of the pins 100 engage the housing 20 in the pin passageways 28. The first end 102 of each of the pins 100 is exposed in the mating cavity 34.

As shown in FIG. 7, when the pin assembly 10 is fully inserted into the housing 20, each of the seals 200 is disposed in one of the sealing openings 40. The rib diameter 232 of the ribs 230 is greater than the opening diameter 42 of the sealing opening 40 and the seal 200 is elastically compressed between the sealing walls 38, sealing the sealing opening 40 and the end of the pin passageway 28 adjacent to the sealing opening 40 and helping to retain the pin 100 in the pin passageway 28. The elastic force F and/or the adhesion A are sufficiently strong to resist any displacement of the seals 200 along the longitudinal direction L due to contact with the sealing walls 38.

After the pin assembly 10 is inserted into the housing 20 in the step 450, as shown in FIG. 8, the pins 100 may optionally be bent as shown in FIG. 7 in a step 460. In other embodiments, the step 460 may be omitted and the pins 100 may be left unbent.

In the shown embodiment, the connector 1 formed by the process 400 is a header. In other embodiments, the connector 1 may be any other type of electrical connector having the pins 100 and the housing 20 as shown herein.

In the pin assembly 10 according to embodiments of the invention, the seals 200 disposed separately on each of the pins 100 are simple to produce and are scalable for a wide range of applications; the same seals 200 could be produced for a connector 1 requiring four pins 100, for example, as for a connector 1 requiring twelve pins 100. The seals 200 are further capable of being retained on the pins 100 by the elastically deformable material 240 and do not require additional elements to secure the seals 200 in position.

In the connector 1 according to the invention, the pin assembly 10 is inserted into the housing 20 in the single step 450, in a single motion, positioning the first ends 102 in the mating cavity 34 and sealing the sealing openings 40 and ends of the pin passageways 28 by contact of the seals 200 with the sealing portion 36. The pins 100 are retained in the housing 20 and the seals 200 are elastically compressed by the sealing portion 36 as the result of the single step 450, allowing a more efficient operation that could be accomplished within one station of an assembly system. The pins 100 of the pin assembly 10 with individual seals 200 disposed on each of the pins 100 increases the flexibility and reliability in forming a seal with the housing 20 without requiring substantial additional production processes or retention elements.

What is claimed is:

1. A pin assembly, comprising:
a plurality of pins, each of the pins has one or more discrete barbs extending from a portion of an outer surface less than a circumference of the outer surface; and
a plurality of seals separate from one another and each formed from an elastically deformable material, the seals are each disposed on one of the pins at a largest outer diameter of the outer surface excluding the barb of the one of the pins, the seals are each retained on the one of the pins along a longitudinal direction of the one of the pins by an elastic force of the elastically deformable material acting on the one of the pins in a direction perpendicular to the longitudinal direction, each of the seals has a seal body with a protrusion extending from an inner surface of the seal body, the protrusion is elastically compressed between an outer surface of the one of the pins and the seal body.

2. The pin assembly of claim 1, wherein the inner surface of each of the seals directly abuts the outer surface of the one of the pins.

3. The pin assembly of claim 1, wherein the seals are each retained on the one of the pins by an adhesion of the elastically deformable material to the one of the pins.

4. The pin assembly of claim 1, wherein the plurality of seals are identical to one another and the plurality of pins are identical to one another.

5. The pin assembly of claim 1, wherein each of the seals has a rib protruding from an outer surface of the seal body.

6. The pin assembly of claim 1, wherein the barb is positioned adjacent to the seal disposed on the pin.

7. The pin assembly of claim 1, further comprising a band having a plurality of securing elements attaching the pins to the band.

8. The pin assembly of claim 1, wherein the seals are each retained on the one of the pins along the longitudinal direction only by an interaction between the seal and pin to create an elastic force from the elastically deformable material acting in the direction perpendicular to the longitudinal direction to thereby retain the seal on the pin.

9. A connector, comprising:
a housing; and
a pin assembly disposed in the housing, the pin assembly including a plurality of pins and a plurality of seals, each of the pins has a barb extending from an outer surface, the plurality of seals are separate from one another and are each formed from an elastically deformable material, the seals are each disposed on one of the pins at a largest outer diameter of the outer surface excluding the barb of the one of the pins, the seals are each retained on the one of the pins along a longitudinal direction of the one of the pins by an elastic force of the elastically deformable material acting on the one of the pins in a direction perpendicular to the longitudinal direction, each of the seals has a seal body with a protrusion extending from an inner surface of the seal body, the protrusion is elastically compressed between an outer surface of the one of the pins and the seal body.

10. The connector of claim 9, wherein the housing has a rear wall with a plurality of pin passageways extending through the rear wall, each of the pins extends through one of the pin passageways into a mating cavity of the housing.

11. The connector of claim 10, wherein the housing has a sealing portion extending from a side of the rear wall opposite the mating cavity, the sealing portion has a plurality of sealing walls and a plurality of sealing openings defined between the sealing walls.

12. The connector of claim 11, wherein each of the seals is disposed in one of the sealing openings and is elastically compressed between the sealing walls.

13. The connector of claim 12, wherein each of the seals has a rib protruding from an outer surface of the seal body, the rib has a rib diameter that is greater than an opening diameter of each of the sealing openings.

14. A method for assembling a connector, comprising:
providing a plurality of pins, each of the pins has a barb extending from an outer surface; and forming a plurality of seals separate from one another from an elastically deformable material, the seals are each disposed on one of the pins at a largest outer diameter of the outer surface excluding the barb of the one of the pins, the seals are each retained on the one of the pins along a longitudinal direction of the one of the pins by an elastic force of the elastically deformable material acting on the one of the pins in a direction perpendicular to the longitudinal direction, each of the seals has a seal body with a protrusion extending from an inner surface of the seal body, the protrusion is elastically compressed between an outer surface of the one of the pins and the seal body, further comprising, after the forming step, inserting the pins with the seals disposed on the pins into a housing, the pins are retained in the housing and the seals are elastically compressed by a sealing portion of the housing as a result of the inserting step.

15. The method of claim 14, wherein the seals are each formed separately from the pins and are installed on the pins after formation.

16. The method of claim 14, further comprising attaching the pins to a band prior to the forming step.

\* \* \* \* \*